US 6,554,619 B2

(12) United States Patent
Williams

(10) Patent No.: US 6,554,619 B2
(45) Date of Patent: Apr. 29, 2003

(54) ELECTRONIC INSTRUCTIONAL DEVICE FOR POINT-OF-PERFORMANCE INSTRUCTION

(76) Inventor: Jacquelyn Williams, 43002 Camino Caruna, Temecula, CA (US) 92592-3787

( * ) Notice: Subject to any disclaimer, the term of this patent is extended or adjusted under 35 U.S.C. 154(b) by 174 days.

(21) Appl. No.: 09/841,815

(22) Filed: Apr. 25, 2001

(65) Prior Publication Data

US 2002/0160351 A1 Oct. 31, 2002

(51) Int. Cl.7 .............................................. G09B 23/28
(52) U.S. Cl. ...................................... 434/365; 434/263
(58) Field of Search ................................ 434/365, 262, 434/263, 270, 371, 433, 429

(56) References Cited

U.S. PATENT DOCUMENTS

| | | | | |
|---|---|---|---|---|
| 3,966,055 A | * | 6/1976 | Francavilla | 211/65 |
| 4,140,222 A | * | 2/1979 | Francavilla | 211/65 |
| 4,435,163 A | * | 3/1984 | Schmitt et al. | 434/263 |
| 4,934,940 A | * | 6/1990 | Savery | 434/263 |
| 5,232,370 A | * | 8/1993 | Hoye | 434/263 |
| 5,244,394 A | * | 9/1993 | Serabian-Musto | 434/429 |
| 5,810,601 A | | 9/1998 | Williams | 434/262 |

* cited by examiner

Primary Examiner—Hieu T. Vo
(74) Attorney, Agent, or Firm—Hovey Williams LLP

(57) ABSTRACT

An electronic instructional device (10) operable to teach, through point-of-performance demonstration, proper technique for accomplishing a process, such as performing dental hygiene or preparing a recipe, wherein the device (10) is customized and adaptable to conditions surrounding performance of the particular process. The device (10) broadly comprises a base (12), a display screen (14), a speaker (16), and an input device (18). The device (10) may store instructional information for subsequent recall and communication, or download such information from a network as needed for immediate communication. Furthermore, the device may include a compliance encouraging mechanism 48, such as a telltale or reward mechanism.

22 Claims, 3 Drawing Sheets

ELECTRONIC INSTRUCTIONAL DEVICE FOR POINT-OF-PERFORMANCE INSTRUCTION

BACKGROUND OF THE INVENTION

1. Field of the Invention

The present invention relates to electronic devices for teaching, through pre-recorded visual and audible instruction, proper techniques for accomplishing a process. More particularly, the invention relates to an electronic instructional device operable to teach at point-of-performance, using pre-recorded visual and audible instruction, proper techniques for accomplishing a process, such as performing dental hygiene or preparing a recipe, wherein the device is adaptable to accommodate conditions surrounding performance of the particular process.

2. Description of the Related Art

It is often desirable to provide point-of-performance instruction as to proper techniques for accomplishing a process. The nature of the process may vary widely and include such things as performance of dental hygiene in a bathroom, preparation of a recipe in a kitchen, or performance of a task by an employee at a factory workstation.

An existing, well-known point-of-performance instructional means uses printed material locatable or postable such that it is available for immediate reference during performance by a performer of the process. Unfortunately, being limited to written text or still pictures, without even an audible accompaniment, such means are typically unsuitable for teaching certain processes. Relatedly, such means are typically non-engaging and unable to retain the performer's interest and full attention for the full length of instruction.

Another existing, well-known instructional means uses computer-based multi-media presentations to provide point-of-performance instruction. Portable computers, such as, for example, conventional laptops or notebooks, may be used to execute programs providing professionally developed multi-media presentations, possibly including still and moving pictures as well as speech or other audible cues or accompaniment. Unfortunately, computer-based instruction, particularly using general-purpose computing devices, is typically not cost-effective for or adaptable to the teaching of many processes or conditions encountered at their point of performance. For example, where the process to be taught is proper dental hygiene or preparation of a recipe, and the point of performance is a wet bathroom sink or wet kitchen counter, the associated conditions give rise to substantial risk of electrocution injury to the performer or damage to the general-purpose computing device. Furthermore, the general-purpose computing device, not being adapted or easily adaptable to the particular work surface, may not be locatable where it is needed or most easily viewed.

With regard to computer-based instruction, it is known to use so-called "thin-client" terminals or devices having little or no inherent processing ability, relying instead upon a networked server, and therefore being typically less expensive than a general-purpose computers. Unfortunately, existing thin-client devices are also not well-adapted for use in the point-of-performance teaching of many processes. For example, thin-client devices suffer from the same problems as general-purpose computers when exposed to the wet conditions of a bathroom sink or kitchen countertop.

In light of the above-described and other problems in the art, a need exists for an improved point-of-performance electronic instructional device.

SUMMARY OF THE INVENTION

The present invention solves the above-described and other problems in the art by providing an electronic instructional device operable to teach, through point-of-performance instruction and dynamic communication of information, proper techniques for accomplishing a process, such as performing dental hygiene or preparing a recipe. The device is customized and adaptable to the varying and sometimes extreme conditions surrounding performance of particular processes.

Broadly, the device comprises a base; a display screen; a speaker; and an input device. The base is adapted or adaptable according to the nature of the process and the work surface and environment associated with the process. For example, where the process to be taught is dental hygiene, the base may be waterproof and circular or oval in shape so as to fit conveniently around a bathroom sink; where the process is to be taught at an employee worktable or workbench, the base may be rugged and have a small footprint. Alternatively, the base may be constructed of a material, such as flexible plastic, or in a manner, such as with segmented portions, that it may be user-conformed to a particular performance condition. The display and speaker are coupled with or incorporated into the base and operable to visually and audibly communicate instructional information related to performing the process. The display and speaker may also be waterproof, rugged, or otherwise adapted or adaptable to the circumstances of use. The display also is preferably three-dimensionally positionable, telescopically and otherwise, relative to the base so as to provide an optimum viewing angle. The input device is coupled with or incorporated into the base and operable to allow a user to provide input to the device regarding communication of the instructional information.

In a first embodiment, the device also includes a computer-readable memory containing instructional information for subsequent recall and communication. In a second embodiment, the device includes a network connection with which instructional information may be downloaded from a network to the device for immediate communication. Furthermore, the device may include a reward mechanism for encouraging compliance.

These and other important aspects of the present invention are more fully described in the section entitled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT

Figure 1:
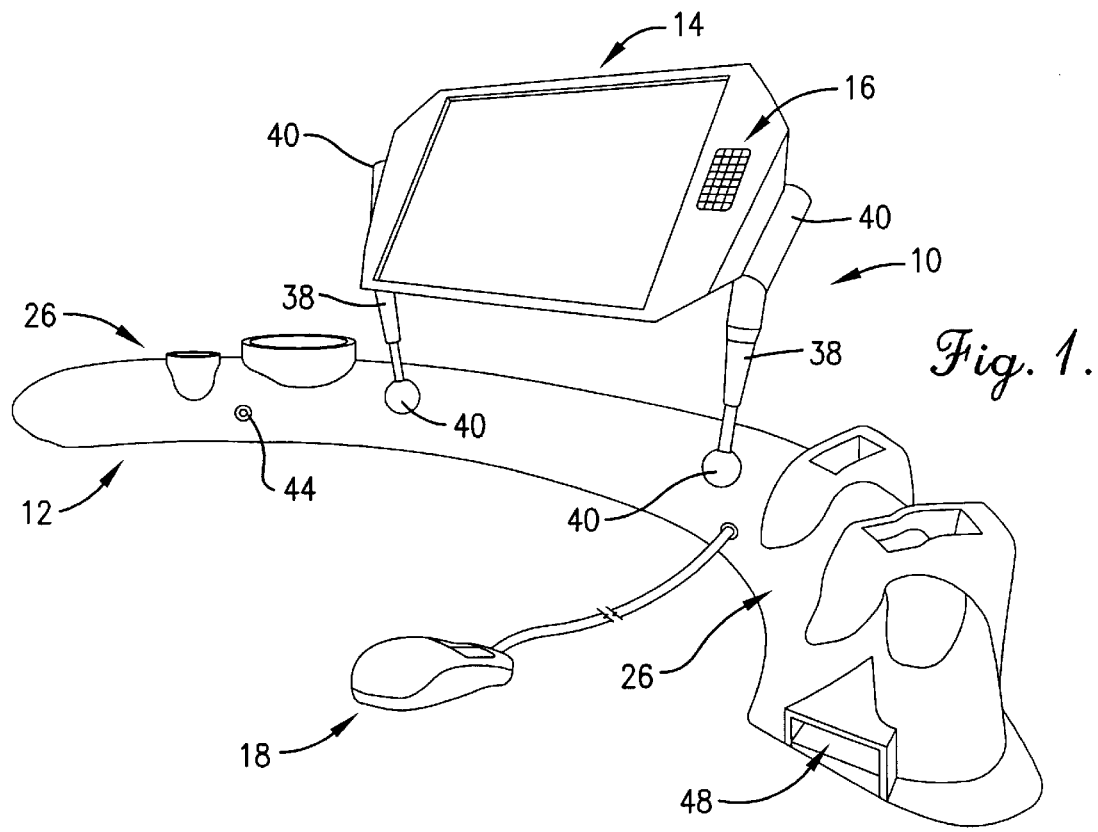
FIG. 1 is a front-right perspective view of a first preferred embodiment of the present invention.
Figure 2:
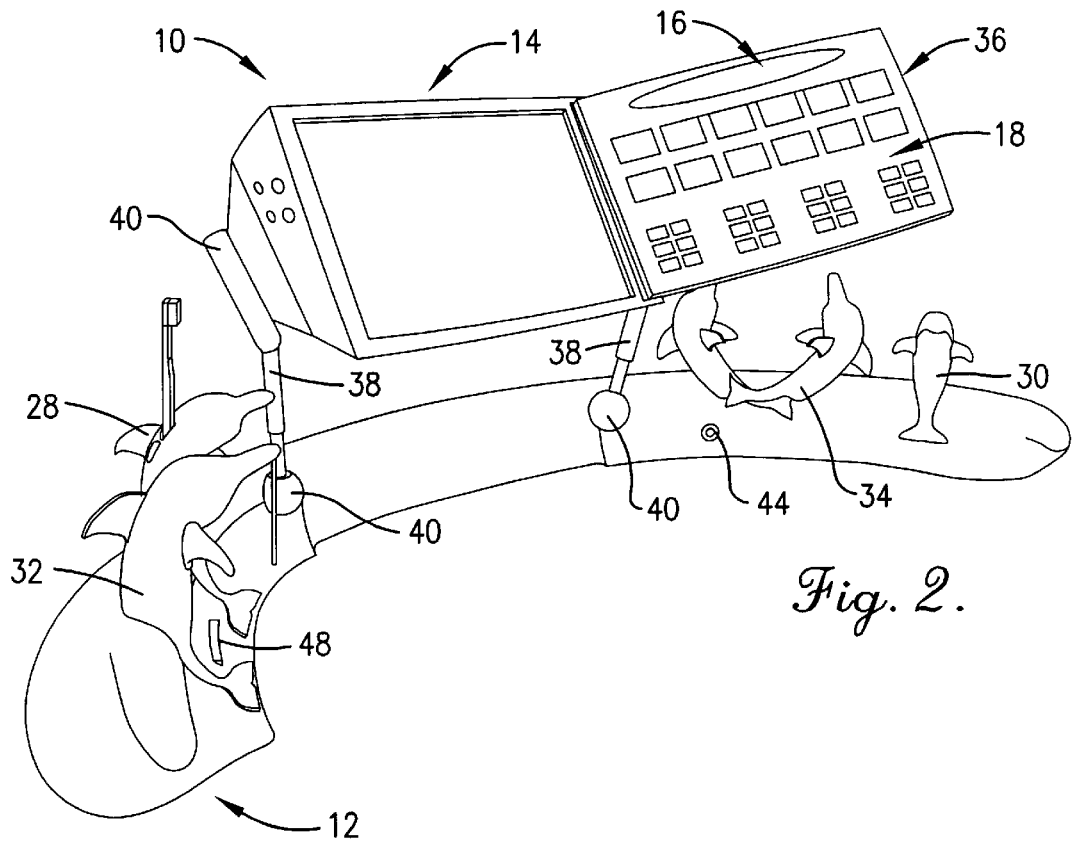
FIG. 2 is a front-left perspective view of a second preferred embodiment of the present invention.
Figure 3:
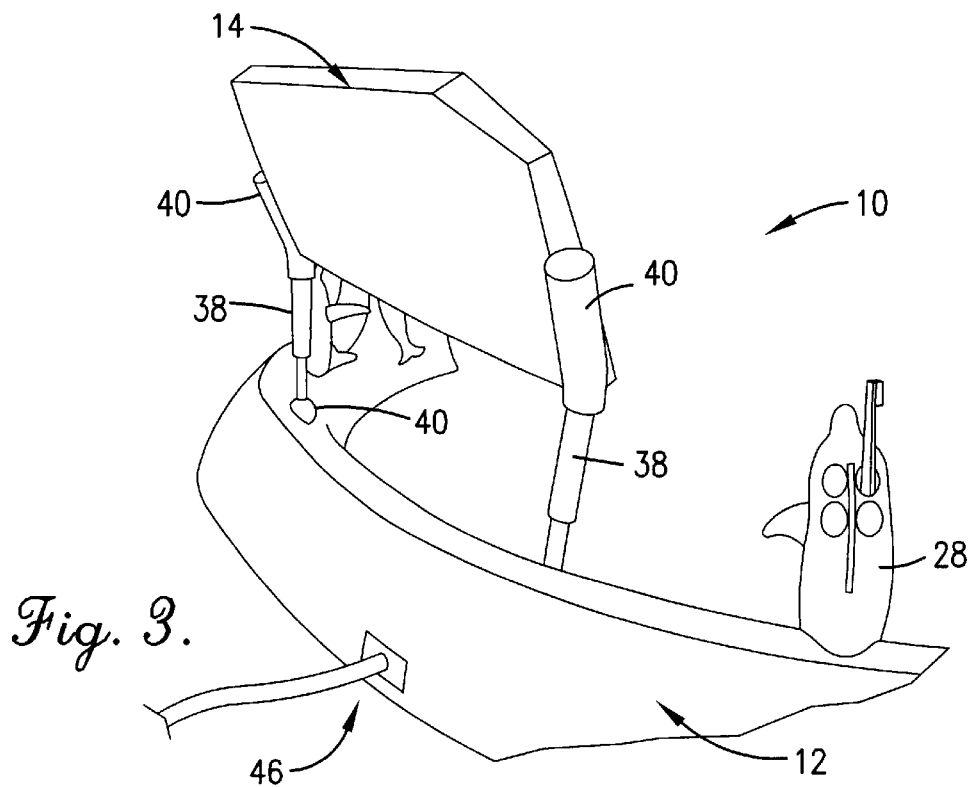
FIG. 3 is a rear-left fragmentary perspective view of the embodiment shown in FIG. 2.
Figure 4:
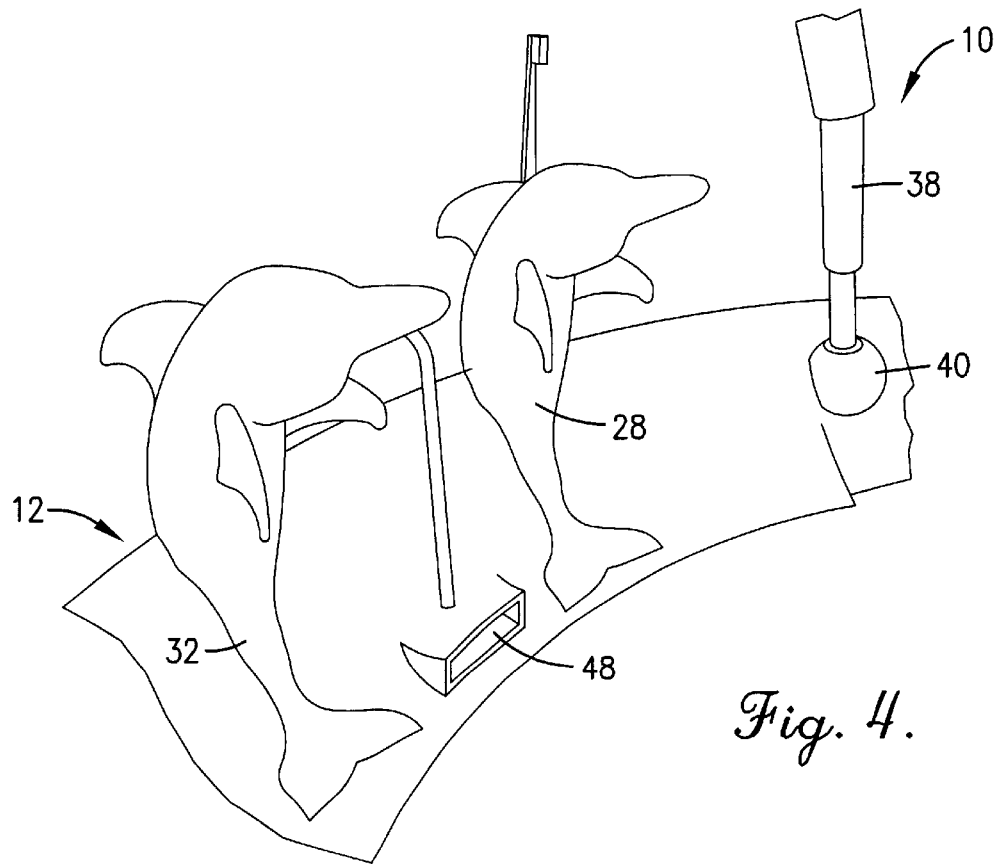
FIG. 4 is a front-left fragmentary perspective view of functional and decorative details of the embodiment shown in FIG. 2.

Referring to FIGS. 1–5, an electronic instructional device 10 is shown operable to teach, through point-of-performance instruction and dynamic communication of information, proper technique for accomplishing a process, such as performing dental hygiene or preparing a recipe. FIG. 1 shows a first, simple embodiment adapted to teaching a first process; FIGS. 2–4 show a second, more detailed embodiment adapted to teaching a dental hygiene process.

In the first preferred embodiment (see FIG. 1), the device 10 broadly comprises a base 12; a display screen 14; a speaker 16; and an input device 18. The base 12 reliably supports and, in some embodiments, protectively houses other more sensitive components of the device 10. The shape, material, and nature of the base 12 is preferably adapted to the nature of the process and to the work surface and environment associated with performing the process. For example, where the point of process performance is an employee worktable or workbench, it may be preferable that the base 12 be of particularly rugged construction; have a small footprint; and include a fastening mechanism, such as a clamp or screws (not shown), to secure the base 12 to the work surface.

For example, in the second preferred embodiment (see FIGS. 2–4), where the process to be taught is proper dental hygiene, the base 12 is made waterproof and circular or oval in shape so as to fit conveniently around a bathroom sink. The base 12 may be constructed of a bendable or otherwise flexible material, such as plastic or foam, or may comprise a number of independently positionable, possibly segmented, portions so as to potentially affect a large variety of shapes. Furthermore, as it may be undesirable to secure the base 12 to the sink or surrounding counter surface, the base 12 may be bottom-weighted to ensure continued proper orientation and resistance to inadvertent movement.

The base 12 may include various process-related structures 26 to facilitate performance of the process. In the dental hygiene example seen in FIGS. 2–4, coupled with or incorporated into the base 12 are a toothbrush holder 28, a toothpaste pump 30, a dental floss dispenser 32, and a cup holder 34. In other applications, such as that shown in FIG. 1, these structures 26 may include such things as pen holders, paperclip holders, staplers, general purpose compartments, or holders for the input devices 18 described below. Furthermore, these structures 26 may take either a utilitarian form or a whimsical or decorative form, such as, for example, dolphins (shown in FIGS. 2–4) or other animals, cartoon characters, seashells, or any other desired theme.

The display 14 is coupled with or incorporated into the base 12 and operable to visually communicate instructional information related to performing the process. The display 14 may be any suitable conventional display, such as, for example, a liquid crystal display (LCD). The display 14, similar to the base 12, may be waterproof, rugged, or otherwise adapted to the circumstances of use, and is preferably three-dimensionally positionable, telescopically or otherwise, relative to the base 12 so as to provide an optimum viewing angle. In the FIGS., the display 14 is shown supported above the base 12 by two parallel support structures 38. These structures 38 are preferably telescopic and coupled with both the display 14 and the base 12 by pivotal ball joints 40, thereby allowing for a wide variety of positioning possibilities and viewing angles.

The speaker 16 is coupled with or incorporated into the base 12 and operable to audibly communicate instructional information, such as spoken words or music, related to or helpful in teaching and performing the process. Furthermore, where proper performance of the process involves a time element, tones or other audible mechanisms for indicating the passage of time may be used.

The speaker 16, similar to the display 14, may also be adapted to the circumstances of use, particularly with regard to its size and location. For example, where the point of process performance involves substantial exposure to water the speaker 16 may be small or thin and housed within and completely enclosed by the base 12 but for a small sound hole (not shown) in the rear of the base 12 oriented away from exposure to splashing water.

As an alternative or in addition to the speaker 16, an audio jack 44 may be incorporated into the device 10 to allow for connection of earphones or headphones for personal use. This feature may be particularly desirable in environments where a number of the devices 10 may be in use and the resulting cacophony of generally audible speaker-produced sound would be undesirable.

The input device 18 is coupled with or incorporated into the base 12 and operable to allow a user to provide input to the device 10 regarding communication of the instructional information. The nature and functionality of the input device 18 may depend upon the circumstances of use. At a minimum, the input device 18 preferably includes start and stop buttons operable to initiate and terminate presentation of the instructional information. It may, however, also be preferable to include rewind, fast forward, and pause functions for controlling the rate at which the instructional information is communicated. It may also be desirable to include a mechanism whereby the user is able to make a selection from a list of choices presented on the display 14. Thus, the input device 18 may, for example, comprise any of the following: one or more buttons or switches, a computer mouse, a light pen, a touch screen (incorporated into or associated with the display 14), or a membranous keypad.

In the first embodiment (FIG. 1), the input device 18 is a computer mouse. In the second embodiment (FIGS. 2–4), the input device 18 takes the form of buttons or keys incorporated into an inside portion of a display cover 36, with the cover 36 being hingedly coupled with the display 14 and operable, in a closed position, to cover and protect the display 14 and input device 18.

Figure 5:
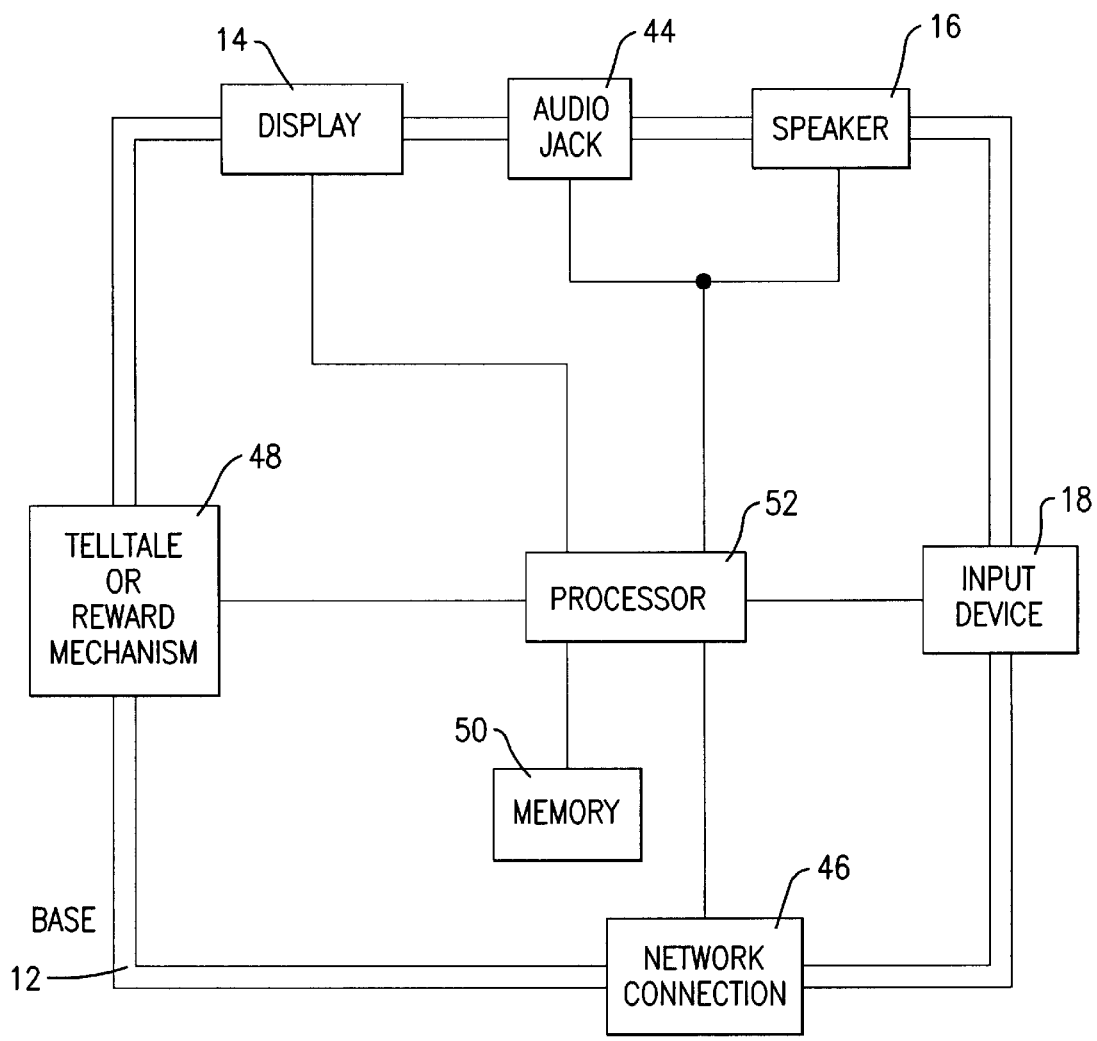
FIG. 5 is a block diagram representation of major external and internal components of a preferred embodiment of the present invention.

Referring also to FIG. 5, with regard to storage of and access to the pre-recorded instructional information, at least two different alternative or complementary embodiments are contemplated. The device 10 may incorporate a computer-readable memory 50 for storing the instructional information for subsequent recall and communication. This memory 50 may be read-only, whether removable and replaceable or not, or read/write, depending upon design choices.

The device 10 may also include a network connection 46 with which instructional information may be accessed and downloaded from a network to the device 10 for immediate communication. The network may be local area network or a wide-area network, such as the Internet. For example, the instructional information may be stored on a local server, which facilitates upgrades and control of dissemination, or available, possibly by subscription, from a website.

In either case, a processor 52 is preferably included, housed within the base 12, and operable to drive the display 14 and speaker 16 in accordance with proper presentation of the instructional information. The processor 52 is also able to perform or control any other functions and mechanisms associated with the device 10.

Additionally, the device 10 may include a telltale or reward mechanism 48 for encouraging compliant use. In telltale form, this feature may be implemented, for example, merely as a resettable light or digital or mechanical counter operable to indicate that the instructional presentation has been run in its entirety. In another embodiment, the telltale feature may include a small printer for dispensing a time- or date-stamped slip indicating completion of the instructional presentation. In reward form, the device 10 may include a dispenser operable to deliver a reward, such as a sticker or coin, or a ticket redeemable for a reward, such as an edible treat or movie.

As noted above, the present invention has numerous applications and application-adapted embodiments. In a first example, the device 10 is used to instruct a child or adult in proper techniques for performing dental hygiene by guiding the user through the American Dental Association's (ADA) recommended dental hygiene process. As shown in FIGS. 2–4, the base 12 is made waterproof for use on a bathroom counter near or around a sink; the display 14 is telescopically and otherwise positionable for optimum viewing; the speaker 16 is located on an inside portion of a display cover 36; and the input device 18 comprises stop, start, and pause buttons, also located on the inside portion of the display cover 36. Furthermore, the instructional information, being relatively simple and non-changing is stored upon and accessible from the non-removable, read-only memory 50. A simple processor 52 accesses the stored information and drives the display 14 and speaker 16 to communicate the information. A reward dispenser 48 is included for children.

In operation, a user places the device 10 at or around the rear of the sink, possibly by manipulating the shape of the base 12 to more closely accommodate the shape of the sink, and positions the display 14 for optimum viewing. The user then opens the cover 36 and presses the start button on the input device 18 and performs the process as visually and audibly instructed. If an interruption occurs, the user may press the pause button to pause instruction, and press start when ready to continue. It may also be desirable to periodically require the user to provide an input during instruction, thus helping to ensure actual compliance. Once the instruction has run to completion, a sticker, coin, or ticket is dispensed as a reward for compliance.

In a second example, as shown in FIG. 1, the device 10 is used to instruct a cook in proper preparation of a user-selected recipe. The base 12 is made waterproof for use on a kitchen counter near or around a sink; the display 14 is telescopically and otherwise positionable for optimum viewing; the speaker 16 is incorporated into the display 14 but for grill- or fabric-covered sound hole; and the input device 18 takes the form of a computer mouse. Alternatively, it may be preferable in this example to use an easily cleanable membranous keypad for input. Furthermore, the instructional information is stored remotely and accessed via the network connection 46 from an Internet website on a subscription basis.

In operation, a user places the device 10 on the counter or around the rear of the sink, possibly by manipulating the shape of the base 12 to more closely accommodate the shape of the sink, and positions the display 14 for optimum viewing. The user then connects the network connection 46 and uses the mouse 18 to establish a connection with and log on to the website. The website may offer a wide variety of categorized recipe instruction, presented as one or more lists from which the user may select a particular desired recipe. Once such selection is made, the user performs the process as visually and audibly instructed. If an interruption occurs, the user may use the mouse 18 to pause, rewind, or fast forward the instruction.

In a third example (not specifically shown), the device 10 is used to instruct a worker in performing a product assembly process. The base 12 is made rugged and small for convenient use on a worktable or workbench; the display 14 is incorporated into the base 12 and not independently positionable (though the base 12 may be); no speaker 16 is included as instruction is entirely visual in nature; and the input device 18 includes start, stop, and pause buttons. Furthermore, the instructional information is either stored on the removable and replaceable memory element 50, which may be a ROM chip or CD-ROM, or stored on and accessed via the network connection 46 from a local server over a local area network. The telltale mechanism 48 is include in printer or timestamp form to measure and track performance.

In operation, a user places the device 10 on the worktable and, where appropriate, connects to the local area network. The user then presses the start button and performs the process as visually instructed. If an interruption occurs, the user may press the pause button to pause instruction, and press start when ready to continue. Once the instruction has run to completion, a timestamped slip is dispensed by the telltale mechanism 48 as evidence of performance.

From the preceding description, it can be seen that the electronic instructional device of the present invention is operable to teach, through point-of-performance instruction and dynamic communication of information, proper technique for accomplishing a process, such as performing dental hygiene, preparing a recipe, or product manufacture. Although the invention has been described with reference to the preferred embodiment illustrated in the attached drawings, it is noted that equivalents may be employed and substitutions made herein without departing from the scope of the invention as recited in the claims.

Having thus described the preferred embodiment of the invention, what is claimed as new and desired to be protected by Letters Patent includes the following:

What is claimed is:

1. An electronic instructional device operable to teach a proper technique for accomplishing a process, the electronic instructional device comprising:
   a base;
   a display screen coupled with the base and operable to visually communicate instructional information related to the proper technique, the display screen being three-dimensionally positionable relative to the base; and
   an input device coupled with the base and operable to receive input related to controlling communication of the instructional information.

2. The electronic instructional device as set forth in claim 1, wherein the base is conformable to a surface associated with performing the process.

3. The electronic instructional device as set forth in claim 2, wherein the base is constructed of flexible material such as plastic or foam.

4. The electronic instructional device as set forth in claim 1, wherein the base comprises two or more hingedly-connected segments.

5. The electronic instructional device as set forth in claim 1, wherein the base is weighted so as to provide a heavier bottom and to thereby more easily maintain proper operating orientation and position.

6. The electronic instructional device as set forth in claim 1, wherein the display screen is telescopically positionable relative to the base.

7. The electronic instructional device as set forth in claim 1, wherein the input device includes the following:
   a start button operable to start communication of the instructional information;

a stop button operable to stop communication of the instructional information;

a rewind button operable to repeat communication of a selected portion of the instructional information;

a fast forward button operable to skip communication of a selected portion of the instructional information; and a pause button operable to pause communication of the instructional information.

8. The electronic instructional device as set forth in claim 1, wherein the input device is selected from the group consisting of the following: computer mice, light pens, track balls, joysticks, touch sensitive screens, membranous keypads.

9. The electronic instructional device as set forth in claim 1, further comprising a speaker operable to audibly communicate an audible portion of the instructional information related to accomplishing the process.

10. The electronic instructional device as set forth in claim 1, further comprising a network connection operable to connect the device to a communications network.

11. The electronic instructional device as set forth in claim 1, further including a printer operable to print and dispense a time-stamped slip, wherein the time-stamp is indicative of the time of completion of communication of the instructional information.

12. An electronic instructional device operable to teach a proper technique for accomplishing a process, the electronic instructional device comprising:

a base;

a display screen coupled with and three-dimensionally positionable relative to the base and operable to visually communicate instructional information related to the proper technique;

a speaker operable to audibly communicate an audible portion of the instructional information;

an input device operable to receive input related to controlling communication of the instructional information;

a processor operable to drive the display screen and speaker and accept input from the input device; and a network connection operable to connect the processor with a communications network.

13. The electronic instructional device as set forth in claim 12, wherein the base is adapted to conform in shape to a sink.

14. The electronic instructional device as set forth in claim 12, wherein the input device is selected from the group consisting of: buttons, switches, computer mice, light pens, track balls, joysticks, touch sensitive screens, membranous keypads.

15. The electronic instructional device as set forth in claim 12, further including a printer operable to print and dispense a time-stamped slip, wherein the time-stamp is indicative of the time of completion of communication of the instructional information.

16. An electronic instructional device operable to teach a proper technique for performing dental hygiene, the electronic instructional device comprising:

a base having a rounded shape so as to conform to a portion of a perimeter of a sink;

a display screen positionably coupled with the base and operable to visually communicate instructional information related to the proper technique;

a speaker operable to audibly communicate an audible portion of the instructional information;

an input device operable to receive input related to controlling communication of the instructional information;

a processor having memory operable to store the instructional information, the processor being operable to drive the display screen and speaker and accept input from the input device to control communication of the instructional information;

a cup holder incorporated into the base; and a toothbrush holder incorporated into the base.

17. The electronic instructional device as set forth in claim 16, wherein the display is three-dimensionally positionable relative to the base.

18. The electronic instructional device as set forth in claim 16, wherein the display screen is telescopically positionable relative to the base.

19. The electronic instructional device as set forth in claim 16, wherein the input device includes the following:

a start button operable to start communication of the instructional information;

a stop button operable to stop communication of the instructional information;

a rewind button operable to repeat communication of a selected portion of the instructional information;

a fast forward button operable to skip communication of a selected portion of the instructional information; and a pause button operable to pause communication of the instructional information.

20. The electronic instructional device as set forth in claim 16, wherein the input device is selected from the group consisting of: computer mice, light pens, track balls, joysticks, touch sensitive screens, membranous keypads.

21. The electronic instructional device as set forth in claim 16, wherein the cup holder and toothbrush holder have a structure adapted to present a decorative theme.

22. The electronic instructional device as set forth in claim 16, further comprising a reward dispenser coupled with the base and operable to dispense a reward upon completion of communication of the instructional information.

* * * * *